US009217457B2

(12) United States Patent
Warkotsch (10) Patent No.: US 9,217,457 B2
(45) Date of Patent: Dec. 22, 2015

(54) QUICK ADJUSTING NUT, ESPECIALLY FOR ATTACHING A VEHICLE WHEEL TO THE MOUNTING SHAFT OF A BALANCING MACHINE

(75) Inventor: Dirk Warkotsch, Burgwedel (DE)

(73) Assignee: Haweka AG, Burgwedel (DE)

(*) Notice: Subject to any disclaimer, the term of this patent is extended or adjusted under 35 U.S.C. 154(b) by 182 days.

(21) Appl. No.: 13/343,759

(22) Filed: Jan. 5, 2012

(65) Prior Publication Data
US 2012/0177463 A1 Jul. 12, 2012

(30) Foreign Application Priority Data

Jan. 7, 2011 (DE) .......................... 10 2011 008 057

(51) Int. Cl.
*F16B 37/08* (2006.01)
*B62K 3/00* (2006.01)
*B62K 25/02* (2006.01)

(52) U.S. Cl.
CPC ............. *F16B 37/0864* (2013.01); *B62K 3/007* (2013.01); *B62K 25/02* (2013.01); *B62K 2206/00* (2013.01)

(58) Field of Classification Search
CPC ...... F16B 37/0864; F16B 37/00; F16B 37/16; F16B 37/02; F16B 37/04; F16B 37/0807; F16B 37/08; B62K 25/02; B62K 3/007; B62K 2206/00
USPC ......... 411/433, 432, 435, 437, 917, 265–267, 411/278
See application file for complete search history.

(56) References Cited

U.S. PATENT DOCUMENTS

| 2,397,905 | A | * | 4/1946 | Acton et al. .................. 384/420 |
| 3,352,341 | A | * | 11/1967 | Schertz ......................... 411/270 |
| 3,707,107 | A | * | 12/1972 | Bieri ............................. 411/423 |
| 4,030,783 | A | * | 6/1977 | McCloskey .................... 384/211 |
| 4,332,169 | A | * | 6/1982 | Stuart ............................. 73/487 |
| 4,336,717 | A | * | 6/1982 | Goebel ........................... 73/487 |
| 4,378,187 | A | * | 3/1983 | Fullerton ..................... 411/267 |
| 4,531,872 | A | | 7/1985 | Warkotsh |
| 4,768,909 | A | | 9/1988 | Warkotsch |
| 4,930,961 | A | * | 6/1990 | Weis ............................. 411/266 |
| 4,974,888 | A | * | 12/1990 | Childers ....................... 292/251 |
| 5,118,237 | A | * | 6/1992 | Wright .......................... 411/433 |
| 5,324,150 | A | * | 6/1994 | Fullerton ..................... 411/433 |

(Continued)

FOREIGN PATENT DOCUMENTS

| DE | 83 08 905 U1 | 8/1983 |
| EP | 1 103 734 A1 | 5/2001 |
| WO | 98/15743 A1 | 4/1998 |

*Primary Examiner* — Roberta Delisle
(74) *Attorney, Agent, or Firm* — Roberts Mlotkowski Safran & Cole, PC; David S. Safran (57) ABSTRACT

A quick adjusting nut (1) made especially for attaching a vehicle wheel to the mounting shaft of a balancing machine, with a housing part (2) and with at least two radially movable thread segments (3) arranged in the housing part (2) and with an actuator (4) for radial movement of the thread segments (3), each thread segment (3) having an inside thread section (3a) and the thread segments (3) being radially movable along guide surfaces (7) of the housing part (2) from an engagement position outward into a disengagement position. The guide surfaces (7) for the thread segments (3) slant upward in the radial outward direction and interact with complementary slanted guide surfaces of the thread segments (3) during movement in the radial direction.

7 Claims, 8 Drawing Sheets

(56) References Cited

U.S. PATENT DOCUMENTS

| | | | |
|---|---|---|---|
| 5,427,488 A * | 6/1995 | Fullerton et al. | 411/433 |
| 5,580,200 A * | 12/1996 | Fullerton | 411/433 |
| 5,749,691 A * | 5/1998 | Campbell | 411/433 |
| 5,755,544 A * | 5/1998 | Muller et al. | 411/433 |
| 6,065,737 A * | 5/2000 | Richardson et al. | 254/29 A |
| 6,082,941 A * | 7/2000 | Dupont et al. | 411/7 |
| 6,361,260 B1 * | 3/2002 | Schirrmacher | 411/433 |
| 6,406,240 B1 * | 6/2002 | Potter | 411/433 |
| 6,712,574 B1 * | 3/2004 | Roopnarine | 411/433 |
| 6,974,291 B2 * | 12/2005 | Li | 411/437 |
| 7,252,471 B1 * | 8/2007 | Manyoky et al. | 411/533 |
| 7,416,375 B2 | 8/2008 | Virdee | |
| 8,061,945 B2 * | 11/2011 | Smith | 411/267 |
| 8,257,004 B2 * | 9/2012 | Smith | 411/266 |
| 2012/0198941 A1 * | 8/2012 | Smith | 73/761 |

* cited by examiner

FIG. 11

# QUICK ADJUSTING NUT, ESPECIALLY FOR ATTACHING A VEHICLE WHEEL TO THE MOUNTING SHAFT OF A BALANCING MACHINE

BACKGROUND OF THE INVENTION

1. Field of the Invention

The invention relates to a quick adjusting nut made especially for attaching a vehicle wheel to the mounting shaft of a balancing machine, with a housing part and with at least two thread segments that are radially movably arranged in the housing part, and with an actuating means for radially moving the thread segments, each thread segment having an inside thread section and the thread segments being movable along guide surfaces of the housing part from an engagement position in a radially outward direction into a disengagement position.

2. Description of Related Art

A quick adjusting nut of the aforementioned type is known from German Application DE 36 05 821 A1 and corresponding U.S. Pat. No. 4,768,909. The known quick adjusting nut has a housing on which there are two handles for tightening the quick adjusting nut. Slots with lateral guide surfaces and axial guide surfaces are arranged in the housing diametrically opposite each other. In each slot is a segment which has an inside thread, supported to be able to move radially, an axial face surface of the segment interacting with an axial face surface of the slot. Upper axial face surfaces of the segments adjoin a disk which is supported in a face-side recess so as to be able to turn with little play, its being held from the outside by a housing cover which is attached to the housing by means of screws. In the region of their upper axial face surfaces, the segments have short pins which engage inclined slots in the disk, and thus, together with the latter form a connecting link guide. Between the disk and the housing cover is a helical spring which has a respective end connected to the disk and the housing cover and is pretensioned such that the disk is pretensioned clockwise, as a result of which, at the same time, the segments are pressed radially to the inside via the connecting link guide. On the disk are arms for actuating the disk in the direction of rotation against the force of the helical spring.

When the known quick adjusting nut is being used in conjunction with a balancing machine to balance vehicle wheels, first a vehicle wheel with its rim is slipped onto the shaft of the balancing machine, this shaft having an outside thread according to the inside thread of the quick adjusting nut. Afterwards, the quick adjusting nut is grasped with one hand, for example, on the handle, pressing with the thumbs against one arm of the disk, and thus, the disk being pressed counterclockwise against the force of the helical spring. The segments are moved radially to the outside into a disengagement position by the connecting link guide. In this state, the quick adjusting nut can be pushed beyond the thread of the axle of the balancing machine and pressed against the rim which, on the side which faces away, comes into contact with a corresponding flange. If the quick adjusting nut has been sufficiently pressed, the thumb is removed from the arm so that the helical spring moves the disk counterclockwise. In this way, the segments are moved radially to the inside via the connecting link guide so that the inside thread sections of the segments fully engage the outside thread of the axle of the balancing machine. Due to the power transmission in the connecting link guide, the thread segments are locked at the same time in the closed position since under these conditions the connecting link guide is self-locking. Finally the quick adjusting nut is tightened by means of the two handles.

Moreover German Application DE 36 05 821 A1 and corresponding U.S. Pat. No. 4,768,909 disclose another quick adjusting nut which in the radial direction has thread segments which can be pivoted to the outside and which are coupled via a connecting link guide to a disk, wherein the use of the quick adjusting nuts takes place in the same way as indicated above. Here, the thread segments will not be able to move apart automatically due to the self-locking of the indicated connecting link guide so that the quick adjusting nut is locked in the clamped position.

In the known quick adjusting nuts, when the inside thread sections of the thread segments are compressively loaded, force components arise which act, for example, on the thread segments and which are directed via the outside thread, for example, of the shaft of a balancing machine in the radial direction to the outside. These opening forces which are directed to the outside are to be captured by the control disk which is connected to the thread segments via the connecting link guide in the known quick adjusting nuts. However, the connecting link guide is subject to play due to production tolerances. The existing play especially with increasing thread wear can lead to the thread segments under compressive loading being pressed away from one another in the radial direction due to the force components which arise and being moved into a disengagement position. Moreover, the thread sections of the thread segments for the known quick adjusting nuts are subject to increased wear; this increases the danger of self-opening of the thread under compressive load. Finally the known quick adjusting nuts have a comparatively large overall height; this is likewise disadvantageous.

SUMMARY OF THE INVENTION

A primary object of this invention is to provide a quick adjusting nut of the initially named type in which the aforementioned disadvantages do not arise. In particular, with compressive forces in the axial direction automatic opening of the quick adjusting nut by movement of the thread segments into the disengagement position will be reliably precluded. Moreover, the quick adjusting nut will be characterized by low wear of the thread surfaces and by a short overall height.

To achieve the aforementioned objects, according to a first embodiment of the invention, for a quick adjusting nut of the initially named type, slanted guide surfaces are provided for the thread segments which rise in a radially outward direction, in the movement of the thread segments in the radial direction the guide surfaces interacting with slanted face surfaces of the thread segments, which surfaces are made complementary.

The thread segments are preferably movable transversely to the middle longitudinal axis of the quick adjusting nut, and thus, in the radial outward direction in the transition from the engagement position into the disengagement position in a linear adjustment motion. In particular, the thread segments are then not pivotally supported on the housing part.

At this point, the invention is based on the idea of generating force components which are directed along an inclined plane radially to the inside by the forced motion of the thread segments with compressive loading of the thread segments. In this way, pressing the thread segments apart under compressive load is made more difficult and can be completely precluded when the pitch angles of the bevels are suitably fixed. Moreover, the wear on the thread segments is reduced.

The thread segments can additionally have straight (radial) face surfaces which border the slanted face surfaces and in the engagement position can also rest against straight (radial) support surfaces of the housing part. In the engagement state, the thread segments are then additionally supported in the axial direction on the housing part via the interacting radial surfaces; this contributes to high stability of the quick adjusting nut in accordance with the invention and a low tendency to wear. In the movement of the thread segments which has been induced by actuating the actuating means to the outside into the disengagement position, the thread segments are pushed radially to the outside along the slanted guide surfaces of the housing part and then are lifted off the straight support surfaces of the housing part.

The thread segments can be made as circular ring segments and extend preferably over an arc length of a circular sector with a midpoint angle of more than 150°, furthermore preferably up to 180°. The extension of the thread segments in the peripheral direction which is greater than in the prior art makes it possible to prepare a larger bearing thread surface; this further reduces the wear on the thread segments. In particular, unhardened thread segments can be used. However, fundamentally, the overall height of the thread segments can also be reduced due to the greater extension in the peripheral direction. In order to form bordering straight and slanted face surfaces on the thread segments, they can be beveled on the face side in regions, the bevel preferably not extending into the region of the two ends of a circular ring segment. Moreover, the ends of the circular ring segments can be laterally flattened and can have straight outer side surfaces which border a circular outer side surface which connects the straight side surfaces and can interact with straight lateral guide surfaces of the housing part.

In order to be able to preclude unwanted automatic opening of the thread segments under load, the pitch angle of a slanted guide surface is larger than half the flank angle of the inside thread section. In this connection, it is preferably provided that the pitch angle of a slanted guide surface be between 1° to 5°, preferably between 2° to 3°, and can be greater than half the flank angle of the inside thread section. If, for example, the inside thread is made as a trapezoidal thread with a half flank angle of 15°, the pitch angle of the slanted guide surfaces can be roughly 17°. This ensures that the thread segments are drawn to the inside under compressive loading and the thread segments cannot move into a disengagement position.

When the known quick adjusting nuts are being used in conjunction with a balancing machine to balance vehicle wheels, the quick adjusting nuts are secured with a thrust collar against a clamping flange or a clamping plate or a rim on the shaft. If the thrust collar is not aligned exactly relative to the housing of the quick adjusting nut, this can lead to increased wear on the inside thread sections of the thread segments when the quick adjusting nut is being used; this increases the danger of unwanted movement of the thread segments under compressive load into a disengagement position.

To achieve the initially named objects, according to one alternative embodiment of the invention for a quick adjusting nut with the initially named features, therefore, it is provided that a thrust collar is movably supported on the housing part. The thrust collar which is arranged to be able to move to the housing part can equalize alignment errors so that the thread surfaces of the thread segments in the quick adjusting nut in accordance with the invention in the clamped position can rest exactly against the outside thread, for example, of a shaft of the balancing machine. This leads to a reduction of the wear of the thread surfaces when the quick adjusting nut in accordance with the invention is being used and acts preventively against unintentional automatic opening of the thread segments under compressive load.

In another preferred embodiment, the thrust collar is supported to be able to turn and pivot (spherically) on the housing part; this ensures an exact alignment of the thrust collar relative to the housing part of the quick adjusting nut and uniform surface pressure of the thread surfaces of the thread segments. In this connection, the housing part on the side of the thrust collar can have a convex spherical sliding surface and the thrust collar can have a concave spherical sliding surface, wherein the thrust collar is connected in the manner of a bearing shell to the housing part. To connect the thrust collar to the housing part, there can be a catch or clamp connection, especially via the edge of the thrust collar.

In order to be able to effectively equalize alignment errors, there can be relative mobility between the thrust collar and the housing part or an equalization angle for spherical support of the thrust collar on the housing part of at least +/−0.5°, preferably from +/−1° to 3°.

The aforementioned aspects and features of this invention as well as the aspects and features of this invention which are described below with reference to the drawings can be implemented independently of one another, but also in any combination.

Other advantages, features, properties and aspects of this invention will become apparent from the following description of one preferred embodiment in conjunction with the accompanying drawings.

DETAILED DESCRIPTION OF THE INVENTION

FIGS. 1 to 8 show a quick adjusting nut 1 for attaching a vehicle wheel to the mounting shaft of a balancing machine, which has a housing part 2 and two radially movable thread segments 3 arranged in the housing part 2, as well as an actuating means 4 for radial movement of the thread segments 3. On the housing part 2, there are two handles 5, 6 for tightening the quick adjusting nut 1. As follows especially from FIGS. 3, 4, and 7 to 9, each thread segment 3 has an inside thread section 3a.

The thread segments 3 can be moved outward in the radial direction along guide surfaces 7 of the housing part 2 from an engagement position which is shown in FIGS. 1 to 4 into a disengagement position which is shown in FIGS. 5 to 11.

For compressive forces which act on the thread segments 3 in the engagement state via the outside thread of a shaft of the balancing machine, in order to prevent the thread segments 3 from being moved unintentionally in the radial direction into the disengagement position, the guide surfaces 7 are formed to rise a radially outward direction, the slanted guide surfaces 7 interacting with complementary slanted face surfaces 8 of the thread segments 3 during movement of the thread segments 3 in the radial direction.

The thread segments 3 are moved from an engagement position into a disengagement position by means of a control disk 9 which is coupled to the thread segments 3 via a connecting link guide in a manner known from German Application DE 36 05 821 A1 and corresponding U.S. Pat. No. 4,768,909, the latter being hereby incorporated by reference to the extent necessary to complete an understanding of this aspect of the invention. Here, the connecting link guide is formed by pins 13, 14 on upper face surfaces of the thread segments 3 which engage slanted slots 15, 16 in the control disk 9.

To actuate the control disk 9, the control disk 9 has arms 10, 11 with which the control disk 9 can be pressed against the force of a helical spring 12; this leads to a radially outward displacement of the thread segments 3 into the disengagement position via the connecting link guide. The helical spring 12 is connected by its ends to the disk 9 and a housing cover 12a. The thread segments 3 are coupled to the control disk 9 according to FIG. 11 via the connecting link guide pins 13, 14 on upper face surfaces of the thread segments 3 which engage the connecting link guide slanted slots 15, 16 in the control disk 9. In this way, when the control disk 9 moves in rotation, only a linear displacement motion in the arrow direction X of the thread segments 3 occurs transversely to the middle longitudinal axis Y of the quick adjusting nut 1 or transversely outward relative to the middle longitudinal axis of a middle opening for slipping onto the mounting shaft in the housing part 2; this is shown schematically in FIG. 3.

Figure 1:
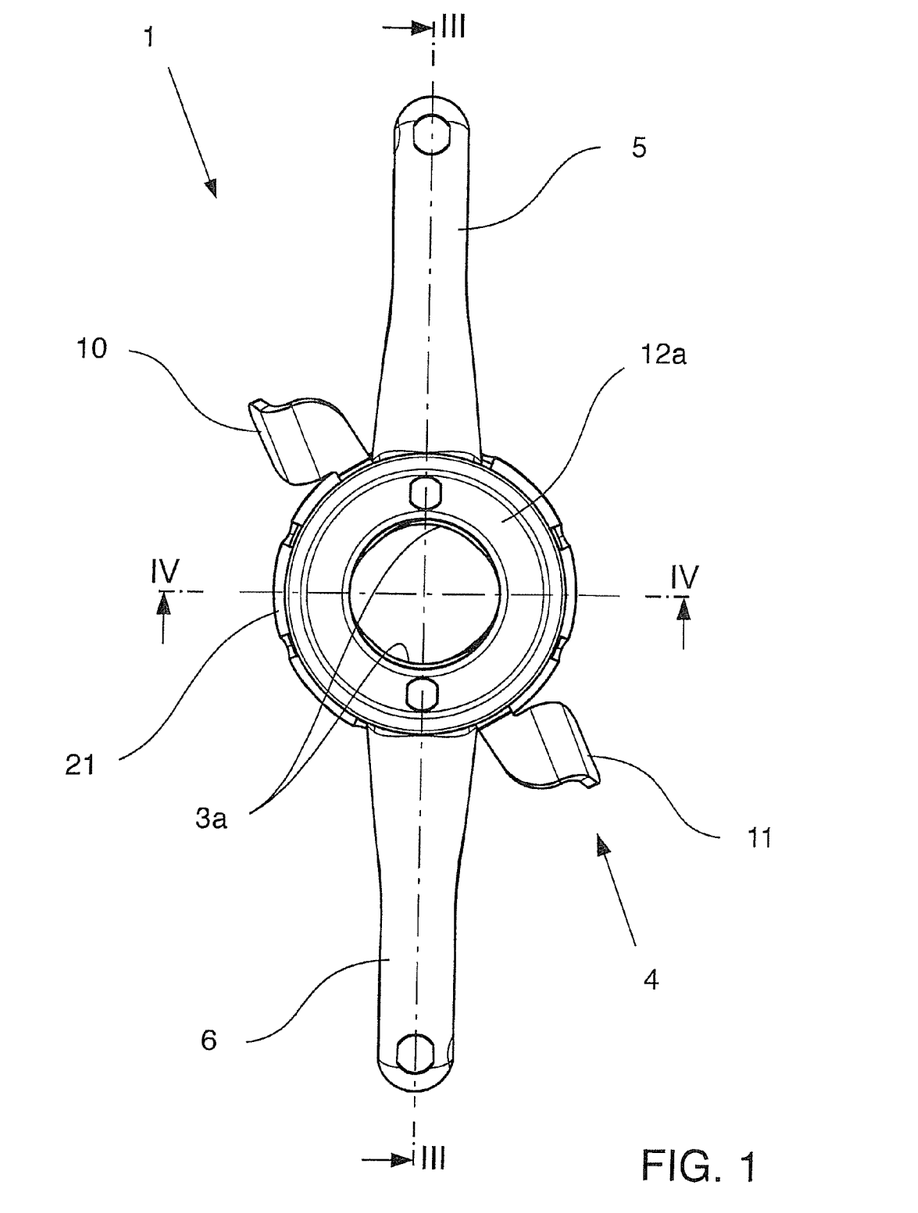
FIG. 1 shows a quick adjusting nut in accordance with the invention in a plan view, thread segments of the quick adjusting nut being located in an engagement position.
Figure 2:
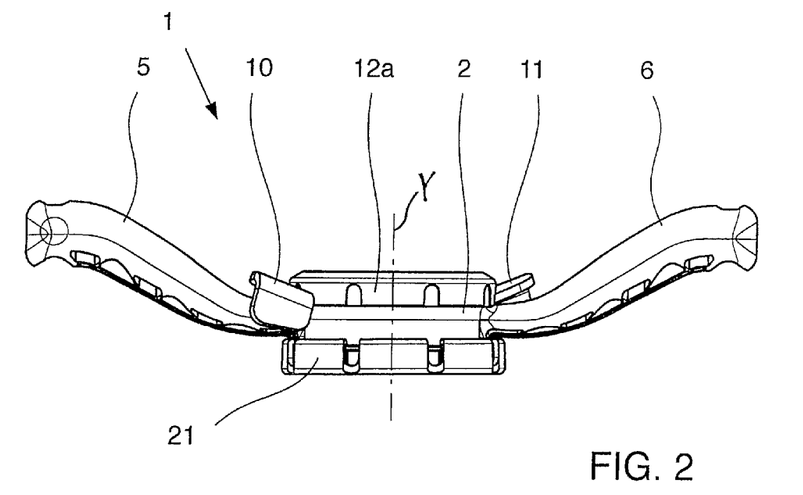
FIG. 2 is a side view of the quick adjusting nut shown in FIG. 1.
Figure 3:
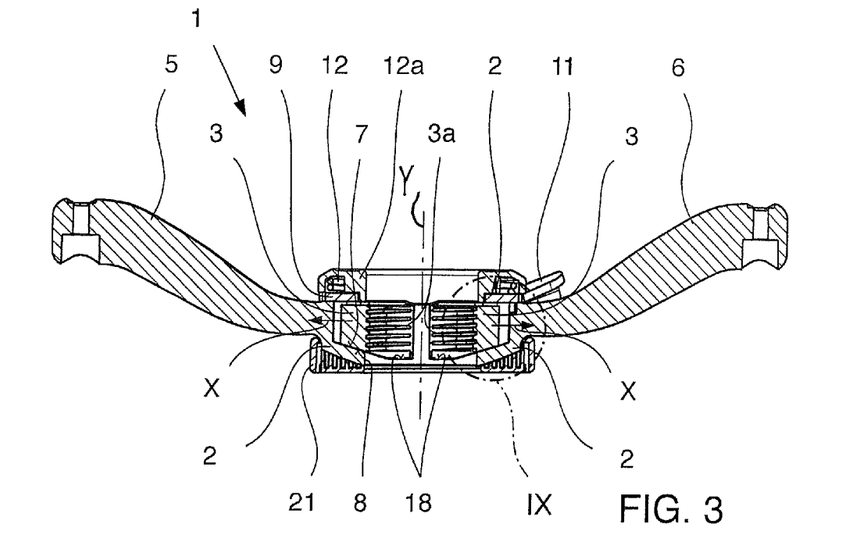
FIG. 3 is a sectional view of the quick adjusting nut shown in FIG. 1 taken along line III-III in FIG. 1.
Figure 4:
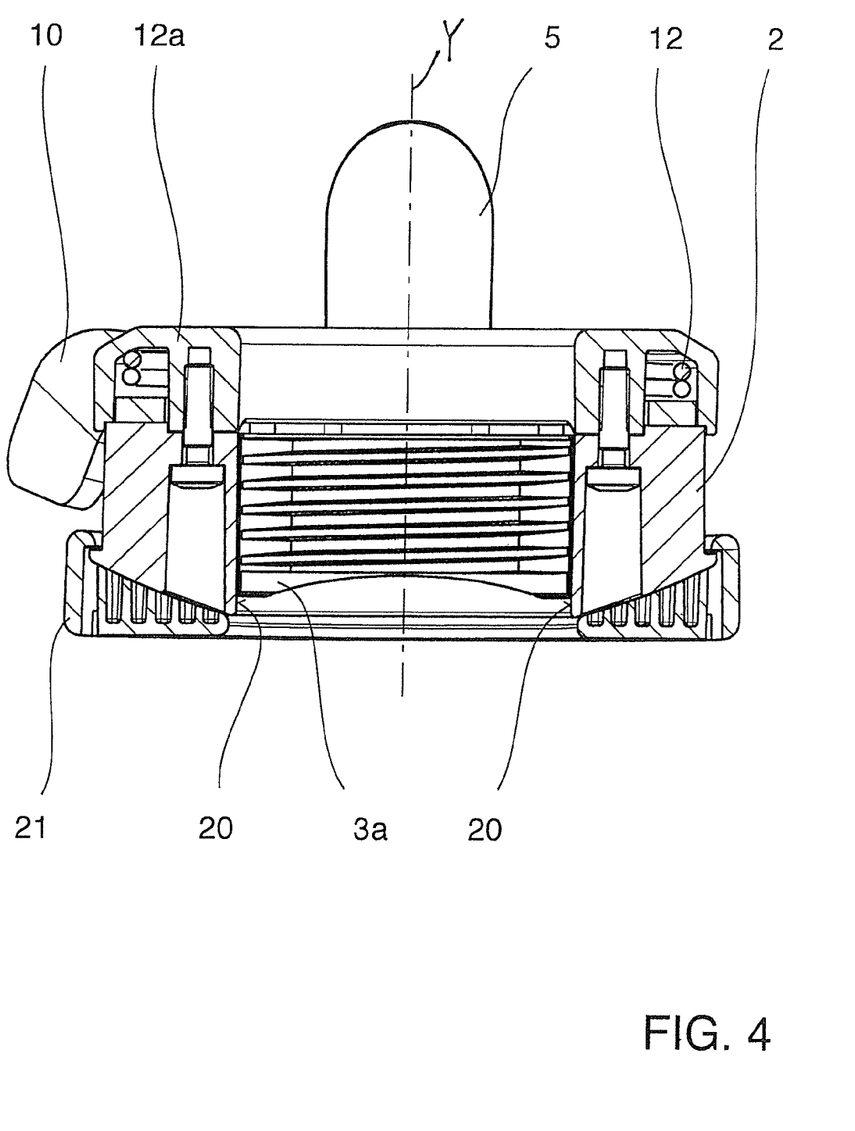
FIG. 4 is a sectional view of the quick adjusting nut shown in FIG. 1 taken along line IV-IV in FIG. 1.
Figure 5:
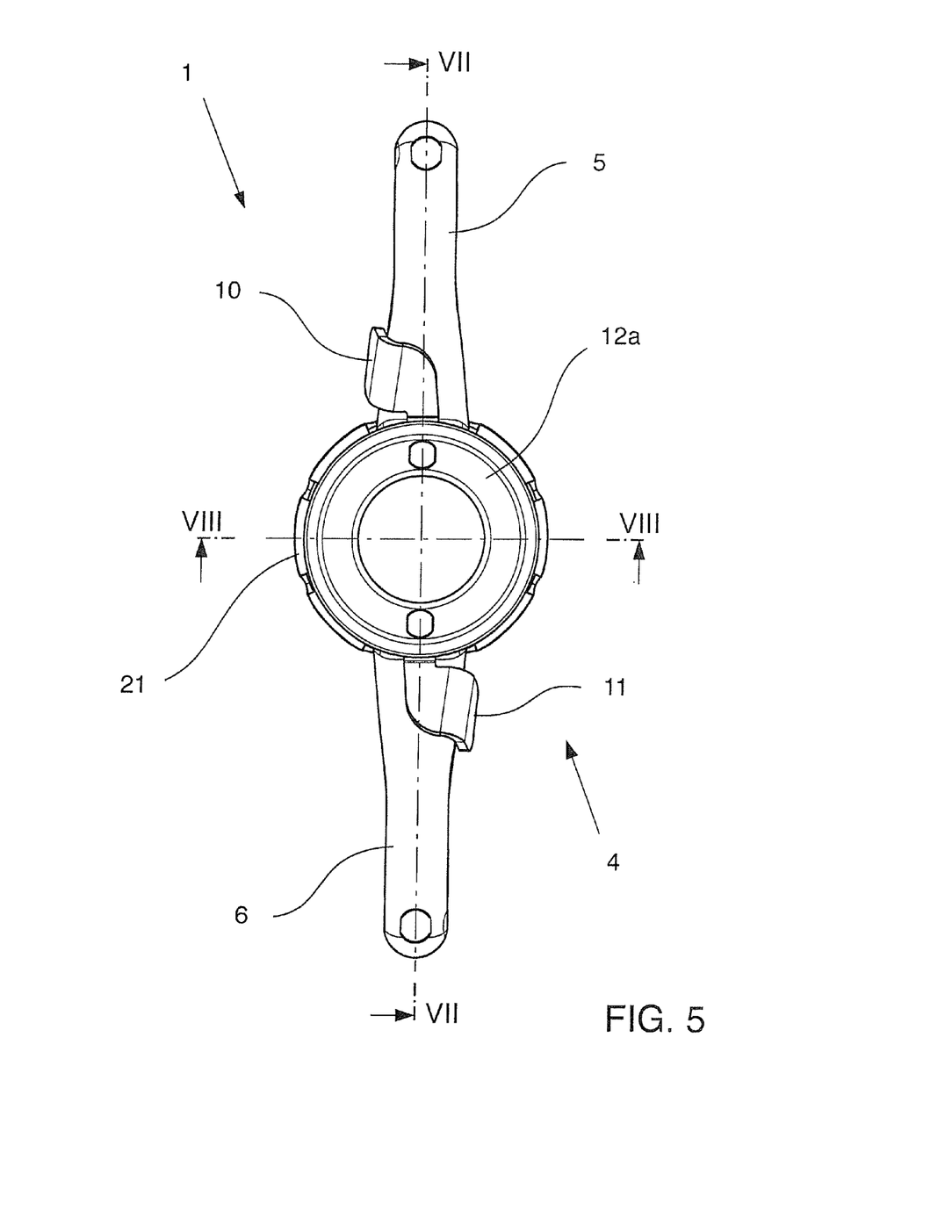
FIG. 5 is a plan view of the quick adjusting nut shown in FIG. 1 after the thread segments are moved into a disengagement position.
Figure 6:
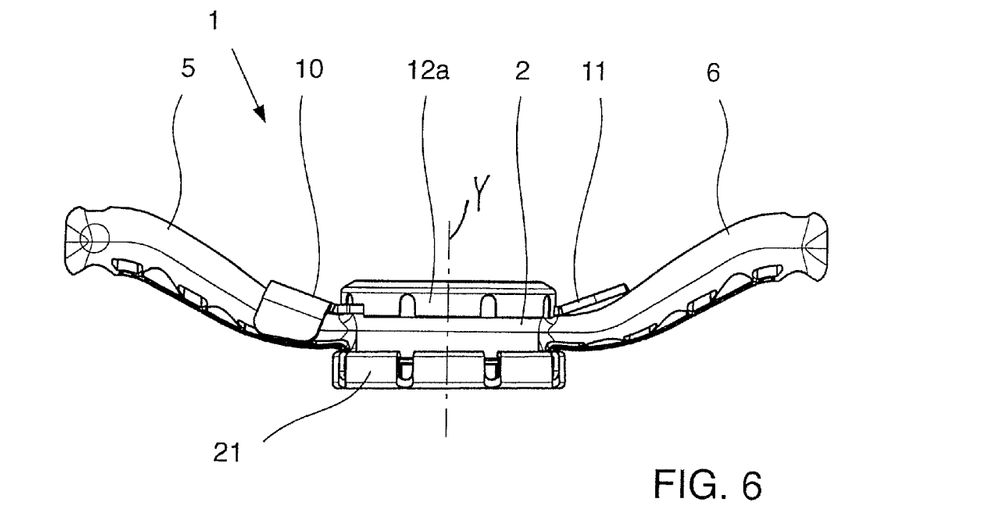
FIG. 6 is a sectional view of the quick adjusting nut as shown in FIG. 5.
Figure 7:
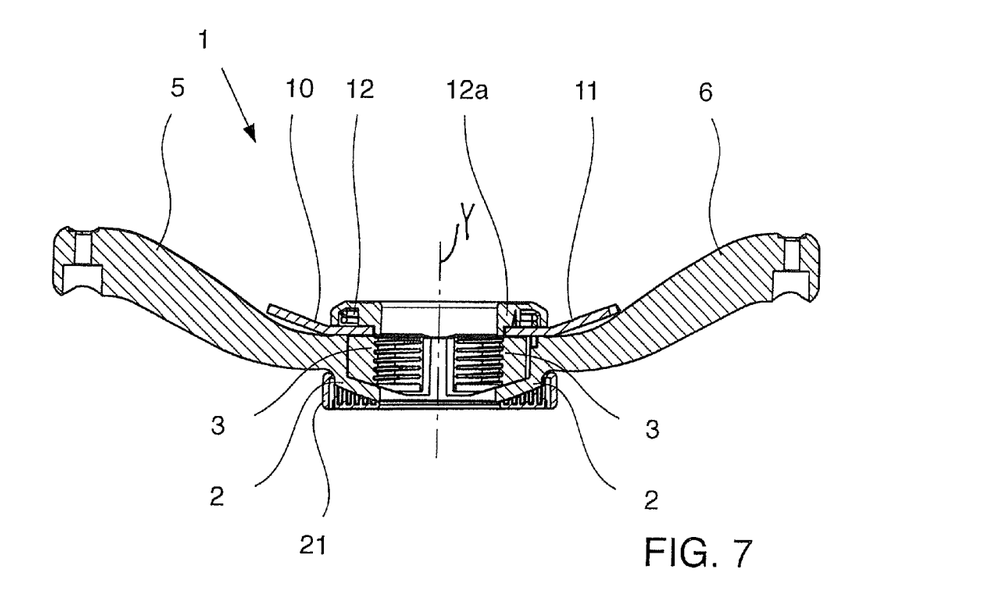
FIG. 7 is a sectional view of the quick adjusting nut taken along line VII-VII in FIG. 5.
Figure 8:
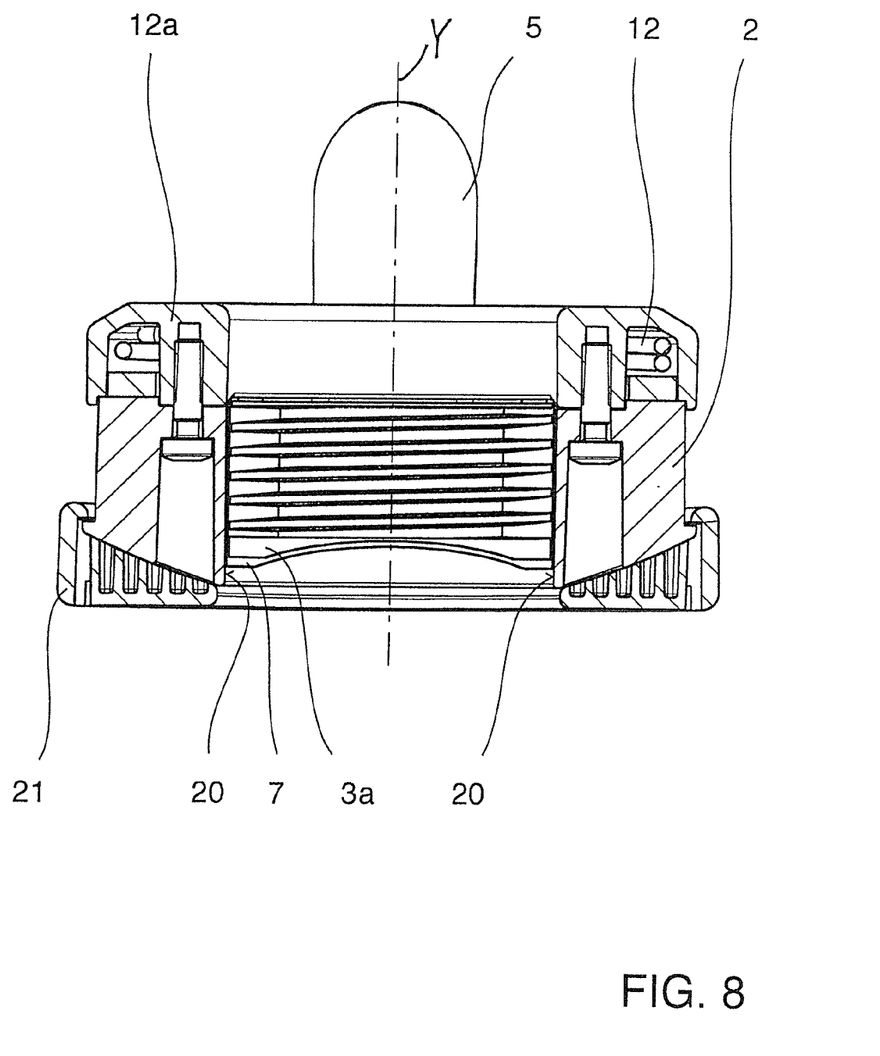
FIG. 8 is a sectional view of the quick adjusting nut taken along line VIII-VIII in FIG. 5.
Figure 10:
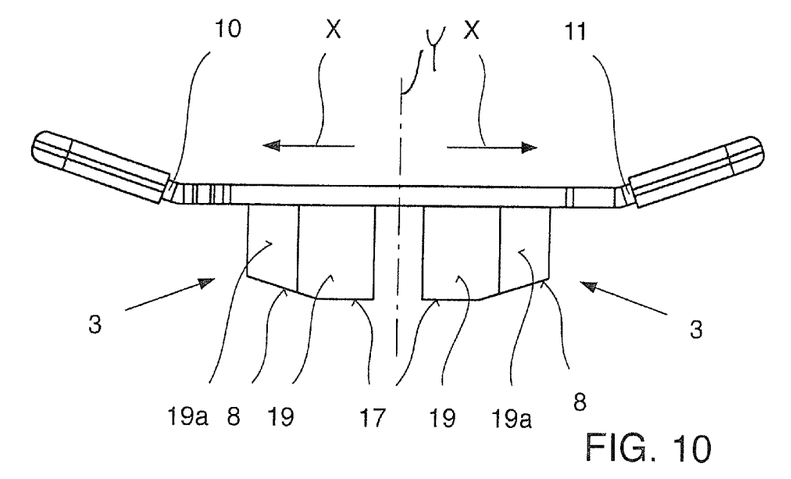
FIG. 10 is a schematic view of a control disk of the quick adjusting nut shown in FIGS. 1 to 8 together with two thread segments of the quick adjusting nut in a side view, the thread segments being moved into a disengagement position.

As follows especially from FIGS. 3 and 10, the thread segments 3 can have inner straight (radial) face surfaces 17 which, in the engagement position, rest against straight (radial) support surfaces 18 of the housing part 2. In this way, the thread segments 3 are additionally supported against the housing part 2 of the quick adjusting nut 1 in the engagement position. During displacement of the thread segments 3, they are then moved over their entire length in the peripheral direction out of the engagement position along the slanted guide surfaces 8, and in doing so, are lifted off the straight support surfaces 18. This is apparent especially in a comparison of FIGS. 3 and 7.

Figure 11:
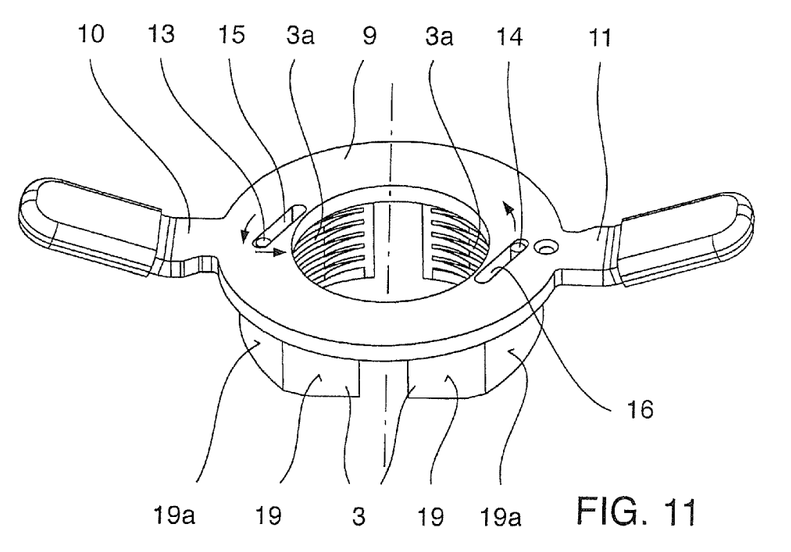
FIG. 11 is a perspective of the arrangement shown in FIG. 10 formed from the control disk and the two thread segments in a view obliquely from overhead.

Otherwise, the thread segments 3 are preferably made as circular ring segments and on the opposite ends can have outer straight side surfaces 19 and which border arched outer side surfaces 19a which connect the straight side surfaces 19. This is shown in FIGS. 10 and 11. It is not shown that the straight side surfaces 19 can also lie on straight axially parallel guide surfaces 20 of the housing part 2 in the engagement state. This yields a stable guidance of the thread segments 3 in the housing part 2.

Figure 9:
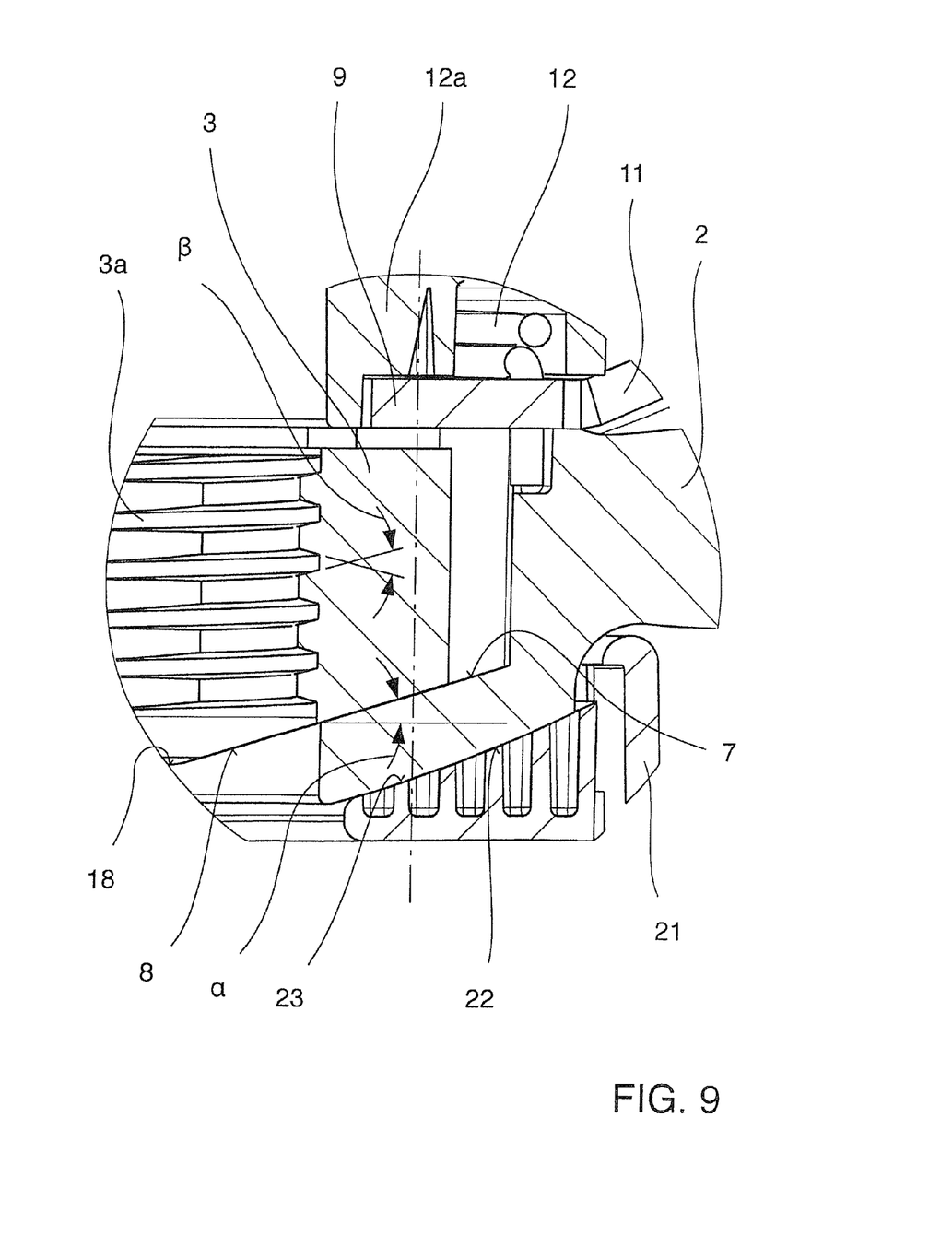
FIG. 9 is an enlarge view of encircled detail IX in FIG. 3.

As follows especially from FIG. 9, the pitch angle α of each slanted guide surface 7 on the housing part 2 relative to horizontal can correspond at least to half the flank angle β of the inner thread section 3a, is preferably between 1° to 5°, and especially between 2° to 3°, greater than half the flank angle β of the inside thread section 3a. This ensures that when the thread segments 3 are loaded in the axial direction via the shaft of the balancing machine, force components are formed which are directed radially inward and which press the thread segments 3 in the direction toward the outside thread of the shaft of the balancing machine, and thus, prevent unintentional automatic opening of the thread segments 3.

Otherwise, a thrust collar 21 can be spherically supported on the housing part 2. For this purpose, the housing part 2 has a convex spherical sliding surface 22 on the side facing the thrust collar 21 and the thrust collar 21 has a facing concave spherical sliding surface 23. The allowable equalization angle for spherical support of the thrust collar 21 on the housing part is preferably +/−0.5°. This equalizes alignment errors, where it is ensured that the thread surfaces of the thread segments 3 are able to engage the outside thread surface of the shaft of the balancing machine largely over the entire surface. This leads to little wear on the thread surfaces. The thrust collar 21 can be held on the housing part 2 by means of a catch connection and/or clamp connection. For corresponding execution of the housing part 2, at a short overall height of the thrust collar 21 altogether, a short overall height of the described quick adjusting nut 1 can be achieved.

What is claimed is:

1. Quick adjusting nut for attaching a vehicle wheel to the mounting shaft of a balancing machine, comprising:
   a housing part,
   at least two thread segments arranged to move radially in the housing part along guide surfaces of the housing part radially outward from an engagement position into a disengagement position, each thread segment having an inside thread section, and
   an actuating means for radially moving the thread segments,
   wherein the guide surfaces are slanted so as to rise in a radially outward direction and interact with complementary slanted face surfaces of the thread segments during radial movement of the thread segments, and
   wherein the guide surfaces have a pitch angle that is between 1° to 5° larger than half of a flank angle of a thread of the inside thread sections.

2. Quick adjusting nut in accordance with claim 1, wherein the thread segments have straight face surfaces radially inward of the slanted face surfaces which, in the engagement position, rest against straight support surfaces of the housing part.

3. Quick adjusting nut in accordance with claim 1, wherein the pitch angle of the slanted guide surface is between 2° to 3° larger than half of the flank angle of the thread of the inside thread sections.

4. Quick adjusting nut in accordance with claim 1, wherein the inside thread section is a trapezoidal thread section with a half flank angle of 15° and wherein the pitch angle of the slanted guide surface is 17°.

5. Quick adjusting nut in accordance with claim 1, wherein said actuating means comprises a control disc arranged to move the thread segments from the engagement position into the disengagement position, the control disc having arms with which the control disc is manually displaceable against the force of a helical spring for producing said radially outward displacement of the thread segments into the disengagement position.

6. Quick adjusting nut for attaching a vehicle wheel to the mounting shaft of a balancing machine, comprising:

a housing part, at least two thread segments arranged to move radially in the housing part along guide surfaces of the housing part radially outward from an engagement position into a disengagement position, each thread segment having an inside thread section, an actuating means for radially moving the thread segments, and a thrust collar which is movably supported on a side of the housing part opposite a side at which said guide surfaces are located, wherein the thrust collar is supported to be able to turn and pivot relative to the housing to equalize alignment errors and to enable a thread surface of the thread segments to rest exactly against an outside thread in the engagement position, wherein the housing part has a convex spherical sliding surface on a side facing the thrust collar, wherein the thrust collar has a concave spherical sliding surface facing said convex spherical sliding surface for sliding thereon, wherein the sliding surface of the housing part rests against the sliding surface of the thrust collar in a clamped position in which the quick adjusting nut is locked.

7. Quick adjusting nut in accordance with claim 6, wherein the guide surfaces are slanted so as to rise in a radially outward direction and interact with complementary slanted face surfaces of the thread segments during radially movement of the thread segments, and wherein the slanted guide surfaces have a pitch angle that is larger than half of a flank angle of a thread of the inside thread sections.

\* \* \* \* \*